Figure 1:
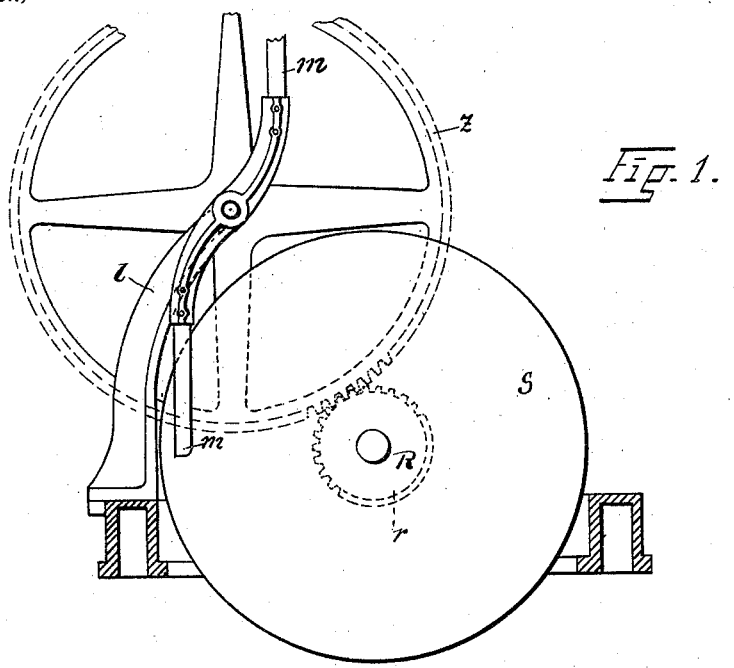
Figure 4:
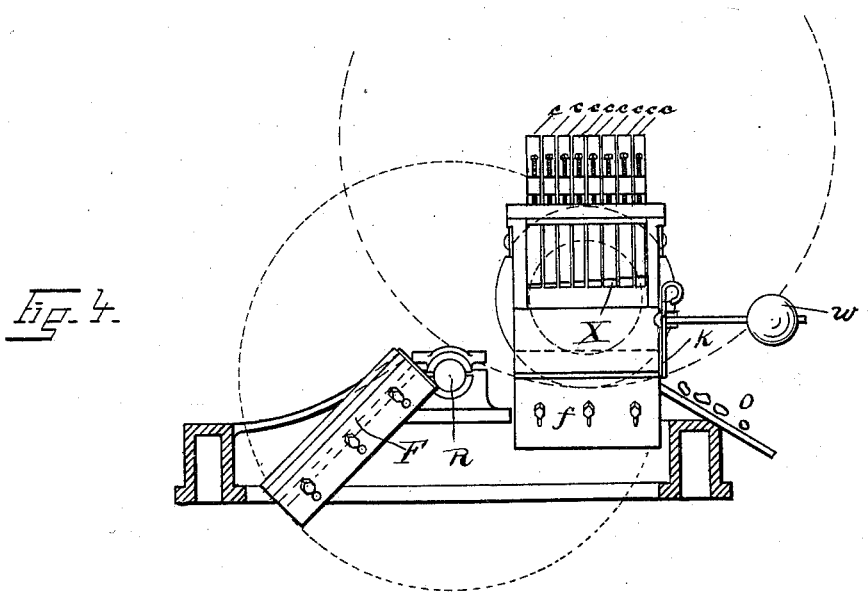

No. 644,795. Patented Mar. 6, 1900.
H. DIESENER.
MACHINE FOR USE IN PREPARING CLAY.
(Application filed Mar. 14, 1898.)

(No Model.) 2 Sheets—Sheet 1.

Witnesses. Inventor.
Hermann Diesener
Konrad Fuhrmann. per Edward Cramer
Attorney.

No. 644,795. Patented Mar. 6, 1900.
H. DIESENER.
MACHINE FOR USE IN PREPARING CLAY.
(Application filed Mar. 14, 1896.)
(No Model.) 2 Sheets—Sheet 2.
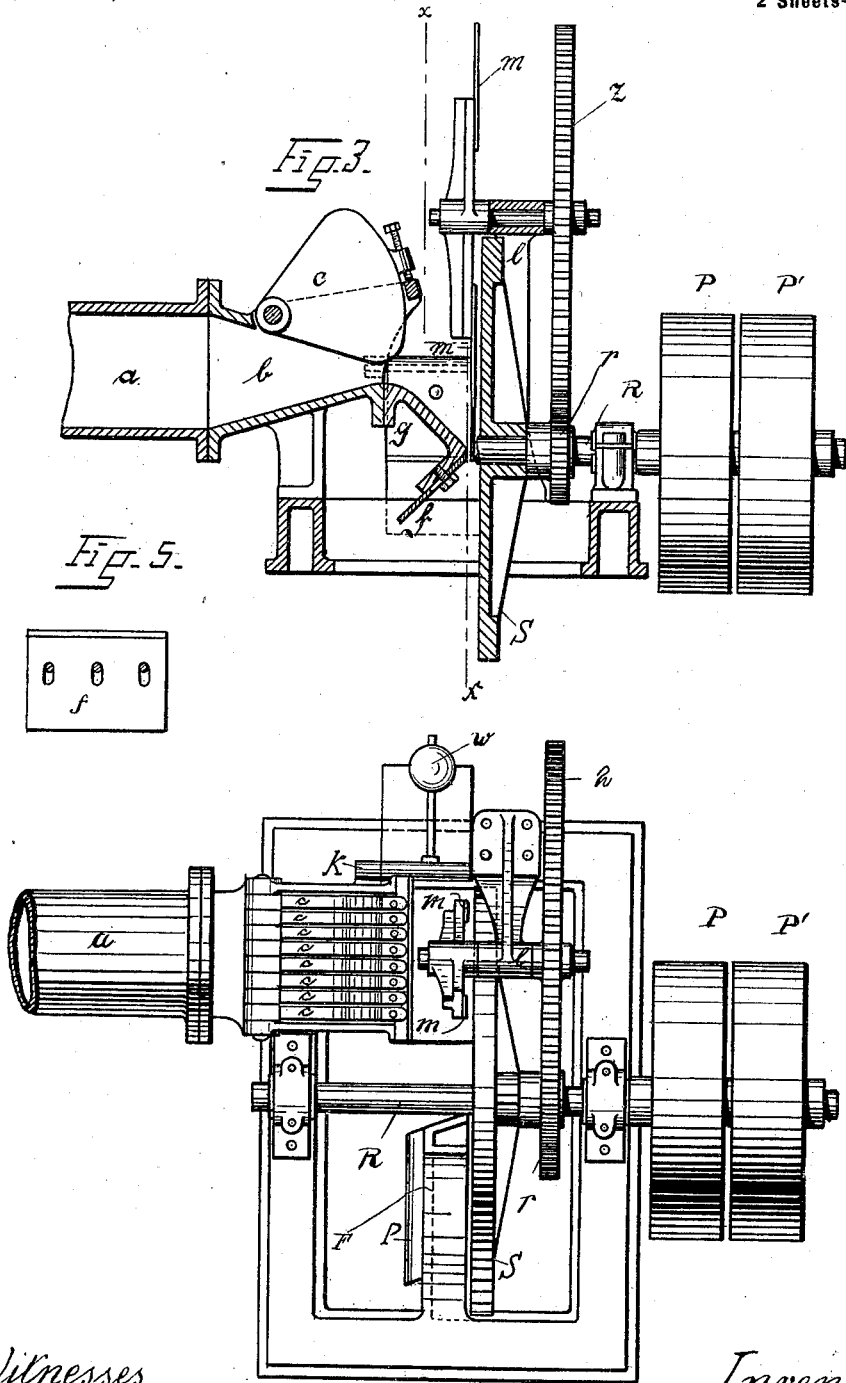

UNITED STATES PATENT OFFICE.

HERMANN DIESENER, OF CHARLOTTENBURG, GERMANY.

MACHINE FOR USE IN PREPARING CLAY.

SPECIFICATION forming part of Letters Patent No. 644,795, dated March 6, 1900.

Application filed March 14, 1896. Serial No. 583,257. (No model.)

*To all whom it may concern:*

Be it known that I, HERMANN DIESENER, of Charlottenburg, near Berlin, in the German Empire, have invented a new and useful Machine for Use in the Preparation of Clay, (which has been patented to me in Germany July 14, 1895, No. 85,991; in Austria March 12, 1896, Vol. 46, page 1804; in Italy, Vol. XXI, No. 41,324, dated April 17, 1896; in Great Britain, No. 23,430, dated December 6, 1895, and in Norway, No. 9,014, dated March 13, 1896,) of which the following is a specification.

My invention relates to a machine which has for its object the freeing of brick-clay when in a plastic condition and of a proper consistency from impurities—such as, for instance, stones, nodules of marl, &c.—and to render the same thoroughly homogeneous in character. In this machine the material to be treated is led under pressure in the form of a layer or column to a rotating disk and is delivered from this in a purified condition through a narrow slit, while the stones and the like are removed by an arrangement of knives, which rotate before the disk and keep the slit open.

In the accompanying drawings, Figure I is a view taken on the section-line X X as shown in Fig. III, the observer facing the disk and knives, with the pug-mill removed. Fig. II is a plan of the machine. Fig. III is a side elevation, partly in section. Fig. IV is a view taken on the section-line X X as shown in Fig. III, the observer facing the pug-mill, with the disk and rotating knives removed; and Fig. V is a detail view of plate $f$.

The layer or column of clay issuing from opening $b$ against guide $g$ is pressed against the disk S, which rotates rapidly. In consequence of the adhesion which takes place the disk tears off from the clay a thin layer, which remains adhering to it. If stones or other foreign materials are present in the clay, they remain suspended in thin layer and are carried with the latter. The clay column, however, is supported on a guide $g$, the edge $f$ of which is formed of a separate adjustable plate, which may be pressed into more or less close proximity to the rotating disk. If the space left between the edge of the said guide and the disk be narrow, the foreign bodies in the clay will be kept back, while the pure clay will be carried forward until it is scraped off from the disk S by the knife F. (Shown in Fig. II.)

For the purpose of removing the stones which remain behind, being too large to pass through the narrow slit, rotating knives $m\ m$ are used, which cut through the clay from underneath and force the stones out.

In Figs. II and III, $a$ is the cylinder of any suitable pug-mill outlet or die, which cylinder is connected with the mouth or outlet $b$. Above the said cylinder are arranged adjustable plates $c\ c\ c$, which are separately movable and which also form the cover of the mouth or opening $b$. To the front of the said mouth or opening is attached a guide $g$, to the forward end of which is fixed at right angles an adjustable steel plate $f$. The guide $g$ is closed laterally by the valve $k$, which can be suitably weighted by the weight $w$ or by means of a spring, the said guide being connected with the stone-chute $o$. The knife F is arranged against the rotating disk S, as shown in Figs. II and IV, and scrapes off the clay from the latter. Above the disk S there is arranged a pivoted lever with knives $m\ m$, the axis of the lever being supported in bearings $l$ and actuated by the toothed wheel $z$ and pinion $r$ on the shaft R of the disk S, said shaft carrying the fast and loose pulleys P P'.

The operation of the machine is as follows: The space between the disk S and the edge of the steel frame $f$, the said space forming the so-called "free-working slit," is regulated according to the degree to which the plastic clay mass is to be purified. The plates $c\ c$ of the mouth or opening $b$, which form the top of the outlet for the clay and which are weighted by their own weight, are so arranged that they leave a free opening. The cross-section of the clay column X has the form of a lengthened trapezium (the broader end being toward the circumference) in order to compensate for the increase in velocity of the surface of the disk S from the center to the circumference. The column of clay issues from the opening $b$, slides on the guide $g$ forward, and is there seized by the rotating disk S. The slight pressure which the clay column exerts on the disk S suffices to produce a certain amount of adhesion sufficiently strong to enable the disk to tear off or peel off the material from the column. Solid bodies—such as stones, nodules, roots, and the like—remain lying on the working slit formed by the steel plate $f$ until they are forced by means of the rotating knives laterally through the valve $k$, which is pressed against the opening by the weight $w$. The knives $m$ $m$ enter the working slot from below, clear it out, and cut through any clay nodules which may be present, and simultaneously force forward solid stones and the like to the outer edge of the disk S, where they, after being discharged through the valve $k$, fall onto the chute $o$, from which they drop into a suitable receptacle. The purified material, which is now rendered homogeneous, is then scraped off the disk by means of the knife F and falls in the form of rolled strips into a press arranged underneath.

Having now particularly described and ascertained the nature of my said invention and in what manner the same is to be performed, I make the following claims for a machine for the preparation of clay:

1. The combination with a rotary disk, of a support for a column of clay adjacent to the face of said disk, forming a slit, a movable clearing device adapted to pass through said slit between the disk and said support, and a knife located at a distance from said support for removing the clay from the face of said disk, substantially as described.

2. The combination with a rotary disk, of a support for a column of clay adjacent to the face of said disk, forming a slit between them, a rotary clearing device, provided with parts adapted to pass through said slit, between said disk and the clay-support, and a knife secured adjacent to a portion of the face of said disk at a distance from said support for removing the clay from the face of said disk, substantially as described.

3. The combination with a rotary disk, of a support for a column of clay adjacent to the face of said disk forming a slit, a movable clearing device adapted to pass through said slit between the disk and said support, and a knife located at a distance from said support for removing the clay from the face of said disk and adjusting means for varying the width of the said slit, substantially as described.

4. The combination with a rotary disk, of a support for a column of clay adjacent to the face of said disk, an adjustable plate secured to said support for varying the width of said slit, a movable clearing device having parts adapted to pass through said slit, and a knife located at a distance from said support for removing the clay from said disk, substantially as described.

5. The combination with a rotary disk, of a support for a column of clay, adjacent to the face of said disk, an adjustable plate secured to said support for varying the width of said slit, a rotary clearing device provided with knives adapted to be passed through said slit and a stationary knife located at a distance from said support for removing the clay from the face of said disk, substantially as described.

6. The combination with a rotary disk, of a pug-mill outlet or die, disposed perpendicularly to the face of said disk between its center and circumference the discharge-aperture of said die being narrowest adjacent to the center of said disk and increasing in width toward the periphery, and means for removing the clay from the face of said disk, substantially as described.

7. The combination with the pug-mill outlet or die and clay-guide, of a gang of independently-movable weighted plates at the mouth of said pug-mill outlet adapted to bear with their edge on the clay issuing therefrom and abutments to limit the downward movement of said plates, said abutments being independently adjustable to permit a larger clay feed toward the periphery of the disk.

8. The combination with a disk, adapted to rotate in a vertical plane, a pug-mill outlet or die and an inclined-plane guide from said mill-outlet terminating at a slight distance from said disk along a line substantially radial to the axis of the said disk, a gang of independently-movable weighted plates at the mouth of said pug-mill outlet adapted to bear with their edges on the clay issuing therefrom into the guide, a stationary knife mounted on the framework and adjustable to and from the disk, a bearing of the framework, a rotary shaft journaled therein lying above the center of the guide and with its axis perpendicular to the plane of the disk knives radiating from said shaft adapted to traverse the slit between the guide and the disk in a direction from the center to the periphery of the disk, and means for revolving said disk and shaft for the purpose set forth.

In witness whereof I have hereunto set my hand in presence of two witnesses.

HERMANN DIESENER.

Witnesses:
W. HAUPT,
HENRY HASPER.